United States Patent
Kutchcoskie et al.

(10) Patent No.: US 11,083,993 B2
(45) Date of Patent: Aug. 10, 2021

(54) LOW-ENERGY ELECTROCHEMICAL SEPARATION OF ISOTOPES

(71) Applicant: ATOMIC ENERGY OF CANADA LIMITED, Chalk River (CA)

(72) Inventors: Keith Kutchcoskie, Petawawa (CA); Nirmal Gnanapragasam, Petawawa (CA); Hugh Boniface, Deep River (CA); Ian Castillo, Pembroke (CA); Hongqiang Li, Deep River (CA)

(73) Assignee: ATOMIC ENERGY OF CANADA LIMITED, Chalk River (CA)

( * ) Notice: Subject to any disclaimer, the term of this patent is extended or adjusted under 35 U.S.C. 154(b) by 113 days.

(21) Appl. No.: 16/534,513

(22) Filed: Aug. 7, 2019

(65) Prior Publication Data

US 2020/0024755 A1    Jan. 23, 2020

Related U.S. Application Data

(63) Continuation of application No. 14/780,317, filed as application No. PCT/CA2014/000293 on Mar. 28, 2014, now abandoned.

(Continued)

(51) Int. Cl.
| | |
|---|---|
| *B01D 53/32* | (2006.01) |
| *B01D 59/38* | (2006.01) |
| *B01D 59/40* | (2006.01) |
| *B01D 59/50* | (2006.01) |
| *B01D 59/42* | (2006.01) |

(Continued)

(52) U.S. Cl.
CPC ............ *B01D 53/326* (2013.01); *B01D 59/30* (2013.01); *B01D 59/38* (2013.01); *B01D 59/40* (2013.01); *B01D 59/42* (2013.01); *B01D 59/50* (2013.01); *C25B 1/02* (2013.01); *C25B 9/23* (2021.01); *C25B 9/70* (2021.01); *C25B 15/08* (2013.01)

(58) Field of Classification Search
CPC ............ C25B 1/02–12; C25B 9/08–10; B01D 53/326; B01D 59/38; B01D 59/40
See application file for complete search history.

(56) References Cited

U.S. PATENT DOCUMENTS

| | | | |
|---|---|---|---|
| 3,974,048 A | 8/1976 | Hammerli et al. | |
| 6,461,408 B2 | 10/2002 | Buxbaum | |

(Continued)

FOREIGN PATENT DOCUMENTS

| | | |
|---|---|---|
| CA | 2916219 A1 | 12/2014 |
| WO | 2009/157435 A1 | 12/2009 |

(Continued)

OTHER PUBLICATIONS

Wang et al., "A review of polymer electrolyte membrane fuel cells: Technology, applications, and needs on fundamental research", Applied Energy 88(4) 981-1007 (2011).

*Primary Examiner* — Nicholas A Smith
(74) *Attorney, Agent, or Firm* — Nixon Peabody LLP; David S. Resnick; Teresa A. Ptashka

(57) ABSTRACT

The invention relates to isotope separation methods, and methods for separating isotopes with low energy consumption, demonstrated using hydrogen isotopes. Also described are methods for enriching or depleting the isotope present in the hydrogen gas/vapour feed e.g. for tritium removal, tritium enrichment and deuterium enrichment, by arranging a series of cells in a cascaded configuration.

19 Claims, 15 Drawing Sheets

Related U.S. Application Data

(60) Provisional application No. 61/806,427, filed on Mar. 29, 2013.

(51) Int. Cl.
  *B01D 59/30*  (2006.01)
  *C25B 9/23*   (2021.01)
  *C25B 9/70*   (2021.01)
  *C25B 15/08*  (2006.01)
  *C25B 1/02*   (2006.01)

(56) References Cited

U.S. PATENT DOCUMENTS

| | | |
|---|---|---|
| 8,282,811 B2 | 10/2012 | Kosek et al. |
| 2003/0196893 A1 | 10/2003 | McElroy et al. |
| 2004/0211679 A1 | 10/2004 | Wong et al. |
| 2007/0178338 A1 | 8/2007 | McElroy et al. |
| 2009/0035615 A1 | 2/2009 | Urgeghe et al. |
| 2010/0081016 A1* | 4/2010 | Sugiura ............ H01M 8/04089 |
| | | 429/429 |
| 2010/0243475 A1 | 9/2010 | Eisman et al. |
| 2011/0091789 A1 | 4/2011 | Mofakhami et al. |
| 2013/0257199 A1 | 10/2013 | Perry |
| 2014/0072889 A1 | 3/2014 | McElroy et al. |

FOREIGN PATENT DOCUMENTS

| | | |
|---|---|---|
| WO | 2012/041859 A2 | 4/2012 |
| WO | 2012/091692 A1 | 7/2012 |
| WO | 2014209418 A1 | 12/2014 |

\* cited by examiner

LOW-ENERGY ELECTROCHEMICAL SEPARATION OF ISOTOPES

CROSS-REFERENCE TO RELATED APPLICATIONS

The present application is a Continuation Application of U.S. patent application Ser. No. 14/780,317, filed Sep. 25, 2015, which is a 35 U.S.C. § 371 National Phase Entry Application of International Patent Application No. PCT/CA2014/000293, filed Mar. 28, 2013, which claims benefit under 35 U.S.C. § 119(e) to U.S. Provisional Patent Application No. 61/806,427, filed on Mar. 29, 2013, the contents of each of which are incorporated herein by reference in their entirety.

FIELD OF INVENTION

The present invention relates to isotope separation methods, and particularly, to a method and apparatus for separating isotopes with low energy consumption. The isotope relevant to a particular feed element is separable by using an ion-exchange membrane that is specific to the feed element and its isotope(s).

BACKGROUND OF THE INVENTION

Isotope separation typically involves the processing of a particular feed element and concentrating specific isotopes of interest, usually by removing other isotopes from the feed. The separation of hydrogen isotopes is discussed below as but one example of the various isotope separation processes used in the field.

Hydrogen has three naturally occurring isotopes, $^2H$ (deuterium, also labeled as D), $^3H$ (tritium, also labeled as T), as well as the most highly abundant $^1H$ isotope (sometimes called "protium"). Other isotopes have been synthesized in the laboratory, but are not observed in nature.

Hydrogen and its isotopes have a number of applications. For instance, hydrogen is an energy carrier, and can be used for fuel cells. Tritium can also be used, for example, in low power equipment in remote areas. Deuterium, in the form of heavy water ($D_2O$), is useful as a neutron moderator, and is an important component in the CANDU (short for CANada Deuterium Uranium) nuclear reactors developed by Atomic Energy of Canada Limited. However, the high cost of heavy water produced using the Girdler-Sulphide process, and ammonia-based processes, can affect the economic attractiveness of heavy-water moderated reactors such as CANDU.

Several processes are currently available for separating hydrogen isotopes. These include: electrochemical processes, in which water electrolysis cells are used to produce hydrogen and oxygen from water, typically with the heavier hydrogen isotope enriched within the cell electrolyte and depleted in the hydrogen gas; chemical exchange processes, such as the Girdler-Sulfide process, in which hydrogen isotopes are exchanged between hydrogen sulfide and water with the heavier isotope preferentially transferring to the water; phase separation processes, in which fractional distillation or other physical separation processes are used to separate the hydrogen isotopes based on differences in volatility between the lighter and heavier isotopes; diffusion processes in which gas transport, e.g. through a porous membrane, enables the lighter isotope to diffuse more quickly and be enriched in the transported gas; and laser activation, whereby pre-dissociation of formaldehyde with a tuned laser can be used to separate hydrogen and deuterium.

A significant drawback of these processes is that they are energy intensive. In addition, electrolysis cells can be quite large and costly, whereas water distillation requires very large equipment because of the very poor separation factor. The Girdler-sulfide process requires very large equipment and can only be economical for very large-scale production. Membrane diffusion also requires very large equipment, and many stages of pumping which makes maintenance a significant cost. Laser activation uses rather exotic materials, and equipment that is quite costly and complex.

Accordingly, there remains a need for new methods and equipment for efficiently separating hydrogen isotopes, as well as isotopes of other elements.

SUMMARY OF THE INVENTION

It is an object of the invention to provide an improved apparatus and method for separating isotopes.

According to an aspect of the present invention, there is provided an isotope transfer electrochemical cell (ITEC) comprising:

an anode plate and a cathode plate;

an ion exchange membrane positioned between the anode and cathode plates;

gas diffusion layers (GDL) positioned on either side of the ion exchange membrane, which together with the ion exchange membrane form a membrane electrode assembly (MEA); and a housing containing the anode and cathode plates in operable arrangement with the membrane electrode assembly, and defining a gas feed inlet, a product outlet, an outlet for excess feed gas, and internal flow paths for transfer of gases and fluids on either side of the membrane electrode assembly.

In certain embodiments of the isotope transfer electrochemical cell, the ion exchange membrane may comprise a polymer-based proton-exchange material. In addition, the gas diffusion layers may each comprise catalyst-coated porous electrical conductors.

In further embodiments, the housing may comprise end plates on the outer sides thereof, the end plates having gas inlet and gas outlet openings. The end plates may, in further non-limiting embodiments, also comprise an anode side flange and a cathode side flange made of suitable structural materials.

The anode and the cathode may also each comprise connectors to connect to an external power source. For example, yet without wishing to be limiting, the anode and cathode connectors may be made of metals or other electrically-conductive material, and may be electrically insulated from the end-plates.

In further embodiments of the invention, the isotope transfer electrochemical cell may comprise current carriers, positioned between the gas diffusion layers and the respective anode or cathode, the current carriers being of a material effective to conduct current to the electrodes and to form a pathway for gas accessing the anode and discharging from the cathode during operation. In particular, non-limiting embodiments, the current carriers comprise titanium or stainless steel or aluminum based mesh layers.

The gas diffusion layer, in further non-limiting embodiments, comprise a layer of porous electrically-conductive material which has partial water repellent coating on it to allow gas through it while moisture needs to be present in the membrane.

In addition, the gas diffusion layer may comprise a catalyst layer comprising a supported-platinum powder mixed with a suitable binder material held in the said porous electrically-conductive material as a coating.

In yet further embodiments, the ion exchange membrane may comprise a polymer membrane that is conductive to protons. For example, yet without wishing to be limiting, the ion exchange membrane (specifically, proton exchange membrane, PEM) may comprise sulfonated tetra-fluoro-ethylene (TFE) based fluoro-polymer-copolymer (such as Nafion®), or sulphonated polyether-ether-ketone (PEEK). The thicknesses of the dry proton exchange membrane may vary, for instance, in a range from about 0.05 mm to about 0.25 mm.

The housing, hydrogen feed inlet, product outlet, and outlet of the cell are, in embodiments, generally effective to contain and transport hydrogen gas and water vapour. The hydrogen feed inlet, product outlet, outlet for excess hydrogen, and internal flow paths may also be arranged for either co-current or counter-current feed and extract flow directions.

In yet further embodiments, the extract (product stream) may contain isotopically enriched or depleted hydrogen gas, water vapour and condensate. The raffinate (excess of feed stream) contains the balance of hydrogen gas, water vapour and condensate from the feed. The hydrogen gas in the extract can be at elevated pressure with respect to the feed.

Also provided herein is a system comprising a plurality of isotope transfer electrochemical cells as described herein, arranged in series and configured to pass isotopically depleted hydrogen gas from subsequent cells in the series to the feed of previous cells in the series. In certain embodiments, the system may be configured for removal of tritium or protium from a hydrogen source.

Also provided herein is a system comprising a plurality of isotope transfer electrochemical cells as described herein, arranged in series and configured to direct isotopically enriched hydrogen gas from subsequent cells in the series to the feed of previous cells in the series. In certain embodiments, the system may be configured for enriching deuterium or tritium in a hydrogen source.

In addition, there is also provided a method of separating isotopes in a hydrogen source, comprising:

providing at least one isotope transfer electrochemical cell as described herein, feeding a hydrogen gas and water vapour mixture via the feed inlet of the anode side of the cell using said proton exchange membranes, but only feeding hydrogen gas when using membranes which require no water vapour to function;

applying a voltage to the anode to facilitate the formation of hydrogen and isotopic ions on the anode and the transfer of these ions through the membrane electrode assembly to the cathode, the hydrogen and isotopic ions recombining with electrons at the cathode to form gaseous hydrogen with a different isotopic concentration, applying a pressure to the hydrogen gas and water vapour leaving the cathode of the cell, the anode of the cell, or both, collecting excess hydrogen gas and water vapour leaving the anode side of the cell, and collecting extracted hydrogen gas and water vapour leaving the cathode side of the cell, the extracted hydrogen gas being enriched/depleted in deuterium, tritium, or both as compared to the feed gas.

Electrochemical processes for separation of hydrogen isotopes—such as water electrolysis—typically require about 1.5 volts or higher of electrical potential. Thus, the invention is particularly advantageous since it enables hydrogen isotope separation at electrical potentials that are much lower. The current may be applied at a voltage below one volt (often below 0.5 volts) which depends on the required enrichment ratio and resistance due to material and assembly of the internal components of the cell.

In further embodiments, the present invention can also be applied to separating isotopes of elements other than hydrogen. This can be carried out using the methods and apparatus described herein, by selecting a suitable electrolytic (ion-transfer) membrane for the element of interest and its isotope(s).

BRIEF DESCRIPTION OF THE DRAWINGS

These and other features of the invention will become more apparent from the following description in which reference is made to the appended drawings, wherein.

DETAILED DESCRIPTION

Figure 1:
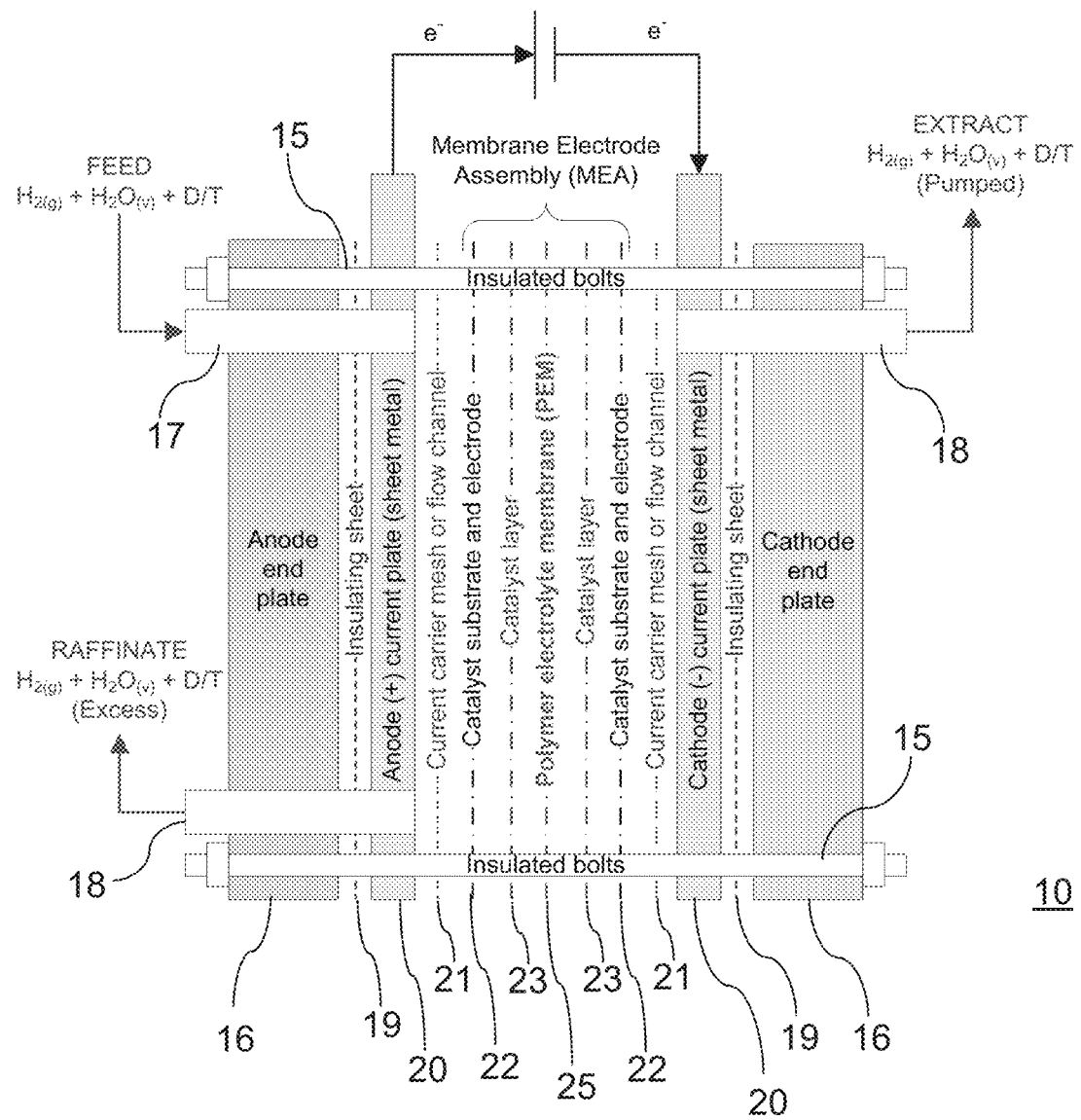
FIG. 1 shows a schematic of an example of a Isotope transfer electrochemical cell (ITEC), illustrating internal components of the cell, in accordance with an embodiment of the invention.

The electrochemical cell described herein can be operated at low power to transfer hydrogen through a membrane in such a way that the transferred hydrogen is enriched in the heavier isotope, and the portion not transferred is enriched in the lighter isotope. By applying the pressure rise resulting from the transfer a staged cascade of cells can also be provided to improve the separation, such that deuterium is enriched to produce heavy water, or tritium can be removed from hydrogen or deuterium.

In an embodiment, the electrochemical cell comprises the following features:

two sides, with anode and cathode end plates, electrical connectors and current carriers;

a proton exchange membrane or polymer electrolyte membrane (PEM) in the middle, which in preferred embodiments comprises a solid polymer-based electrolyte;

gas diffusion layers (GDL) comprising catalyst-coated porous conductors attached on either side of the PEM membrane, which together with PEM form a membrane electrode assembly (MEA); and a mechanical housing with a hydrogen feed point, a product outlet and an outlet for excess hydrogen (raffinate), as well as appropriate internal flow paths for the fluids on either side of the MEA.

When a small electric potential (below 1.0 volt) is applied between the anode and the cathode and hydrogen is supplied to the electrochemical cell, hydrogen isotope separation occurs producing one stream of hydrogen enriched in the heavy isotope and one hydrogen stream depleted in the heavy isotope.

A cascaded arrangement of a series of such cells is also provided, which in certain embodiments allows for: enrichment of deuterium in hydrogen; and removal of tritium from light or heavy water.

Without wishing to be limiting in any way, it is envisioned that using certain configurations of the electrochemical cells and methods described herein can provide one or more of the following beneficial features:

i. low electrical energy: unlike a water electrolysis cell, only a small amount of electrical energy may be needed to separate deuterium or tritium from protium;

ii. only hydrogen gas and water are involved: there is no oxygen production according to the reactions carried out by the described electrochemical cells, and thus the use of oxygen sensitive and oxygen safety related materials is reduced or eliminated;

iii. simultaneous enrichment and depletion: the described electrochemical cells can enrich one portion of a feed stream while depleting the other with deuterium or tritium simultaneously, which makes it easier for the cell to be used in reversible applications.

iv. low or complete lack of electro-catalyst on the cathode side allows the cell to operate in isotope depletion mode with respect to the feed isotope concentration and may reduce significantly the cost of cell construction.

The electrochemical cell and methods of the present invention can, in certain embodiments, be used in the production of heavy water, e.g. for general use, or for use in the nuclear industry; be used in the detritiation of light water, for example as a means for waste remediation; be used in the enrichment or concentration of tritium, for example, to improve sensitivity in very low-level sample analysis; and be used in the upgrading of heavy water, for example in CANDU reactor operations.

Thus, the electrochemical cell and methods of the present invention may provide a practical alternative to the commonly used Girdler-Sulfide heavy water production process, and the various distillation processes currently used for heavy water upgrading and detritiation. Moreover, embodiments of the electrochemical cell and methods of the present invention can be especially advantageous, since they enable hydrogen isotope separation with low energy requirements, while still maintaining a good enrichment ratio.

The electrochemical cell and methods of the present invention will now be described in further detail with reference to one non-limiting embodiment of the electrochemical cell, referred to herein as an Isotope Transfer Electrochemical Cell (ITEC).

Unlike the water electrolysis cells currently used for hydrogen isotope separation, the ITEC can operate at low cell voltages since the hydrogen transfer reaction employed is relatively more facile than the water decomposition reaction. As will be described in further detail below, the ITEC can also be used as an electrochemical compressor to pump a certain isotopic hydrogen gas to high pressures.

The principle of operation of the ITEC is that hydrogen is passed through a proton exchange membrane (PEM) under the influence of an electric current. The ITEC arrangement thus includes the cathode half of a PEM water electrolysis cell and anode half of a PEM fuel cell. The hydrogen is first oxidized on the inlet (anode) side of the membrane to protons which transfer to the cathode side through certain transport mechanisms and are reduced to reform hydrogen gas. In an electrochemical compressor, the objective is for the electric current to produce the hydrogen at a higher pressure at the cathode than the anode side. In the ITEC, on the other hand, the objective is to preferentially transfer one of the hydrogen isotopes from the anode side to the cathode side of the cell. In practice, part of the feed stream to the anode passes through the membrane to the cathode and is enriched (or depleted if there is no catalyst on the cathode side) in one of the isotopes, with the remaining hydrogen from the feed stream being depleted in that isotope. The electrochemical process of transferring hydrogen through a PEM in this way requires no moving parts, uses materials that are well-developed and robust, and requires modest voltages and hence, power. Thus, this method of hydrogen isotope separation has the potential to be both practical and economical.

Chemical Reactions

Hydrogen isotopes have three possible transport processes happening inside the MEA of the ITEC at steady state: (i) electrochemical reaction, (ii) isotopic separation, and (iii) transport of hydrogen gas and solvated protons (hydronium ion—$H_3O^+$). The electrochemical separation processes within an ITEC occurs on both anode and cathode when appropriate cell voltage is applied. In the presence of a catalyst, there are two primary reactions occurring at anode and cathode of the cell. The anode reactions can be expressed as Equations 1, 5, and 6. The cathode reactions can be expressed as Equations 7-9. Only deuterium based reactions are provided here, tritium follows similar principles. By careful selection of the catalyst and the cell voltage, isotopes will be preferentially enriched/concentrated at the cathode. The hydrogen isotopic separation in general involves two principles:

a) Equilibrium isotope effect (EIE) and its isotopic analogues:

$$HD_{(g)} + H_2O_{(l)} \rightleftharpoons H_{2(g)} + HDO_{(l)} \qquad (1)$$

This effect is the end result of the catalyst present at both the electrodes. This effect occurs in two consecutive steps

$$HD_{(g)} + H_2O_{(v)} \rightleftharpoons H_{2(g)} + HDO_{(v)} \qquad (2)$$

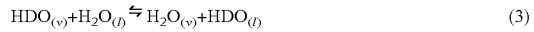

$$HDO_{(v)} + H_2O_{(l)} \rightleftharpoons H_2O_{(v)} + HDO_{(l)} \qquad (3)$$

b) Kinetic isotope effect (KIE) is inherent in electrolytic hydrogen evolution reaction; here it occurs in the cathode of the ITEC.

$$KIE = \frac{k_H}{k_D} \quad (4)$$

Where $k_H$ and $k_D$ are reaction rate constants for hydrogen and deuterium reactions, respectively.

The reactions in the equations above are well known characteristics in liquid phase catalytic exchange processes for hydrogen isotope separation. Within the ITEC, the reactions occurring on anode and cathode are:

Anode Reactions for ITEC:

$$2H_2O_{(v)} + H_{2(g)} \rightarrow 2H_3O^+ + 2e^- \quad (5)$$

$$2H_2O_{(v)} + HD_{(g)} \rightarrow H_3O^+ + H_2DO^+ + 2e^- \quad (6)$$

$$HD_{(g)} + H_2O_{(l)} \rightleftharpoons H_{2(g)} + HDO_{(l)} \quad (1)$$

Cathode Reactions for the ITEC:

$$2H_3O^+ + 2e^- \rightarrow H_{2(g)} + 2H_2O_{(v)} \quad (7)$$

$$H_3O^+ + H_2DO^+ + 2e^- \rightarrow HD_{(g)} + 2H_2O_{(v)} \quad (8)$$

$$2H_2DO^+ 2e^- \rightarrow D_{2(g)} + 2H_2O_{(v)} \quad (9)$$

These reactions occur in sequence as hydrogen passes through the three zones within the cell where: (i) gas is oxidized into ions on the anode side, (ii) ions transport through the membrane with isotopes from either side approaching equilibrium; and (iii) ions are reduced to form gas on the cathode side. Of these reaction steps one will typically be the reaction rate-limiting step, which is the slowest reaction step compared to the other reaction steps. Material and operating conditions of the ITEC determine this rate-limiting step. Within the ITEC the reaction steps occur only in the catalyst layer of the anode and cathode sides while the kinetic isotope effect may occur simultaneously on either side depending on local electronic and ionic conduction and concentration gradients. The ionic forms of the hydrogen isotopes need to be transferred from the anode to the cathode through the membrane of the ITEC. Three possible ionic transport mechanisms are believed to be present within the membrane:

a) surface conduction via proton hopping,
b) bulk conduction via Grothuss diffusion, and
c) bulk conduction via en masse diffusion.

The driving force for proton transport across the membrane is mainly due to the existence of electrolyte potential gradient while the effect of diffusion within the membrane is relatively small [Y. Wang, K. S. Chen, J. Mishler, S. C. Cho, X. C. Adroher. A review of polymer electrolyte membrane fuel cells: Technology, applications, and needs on fundamental research. Applied Energy, 88 (2011) 981-1007]. Thus the proton transport occurs in only one direction within the electrochemical cell from anode to cathode. Water in the membrane is essential for proton transport through a mechanism called 'vehicular' diffusion. This happens when protons form hydronium ions ($H_3O^+$), which can transport from high to low proton concentration regions. The vehicular diffusion seems to occur at a typical water content of about 22% as the channels between water clusters within the membrane are beginning to form at a water content of 14%. This vehicular mechanism dominates at high hydrogen partial pressures while the transport along proton-binding groups (such as sulfonate), through proton tunneling (or hopping of protons), dominates at low hydrogen partial pressures. Recent experimental work in low hydrogen partial pressure range has revealed two other particularly noteworthy features of the Nafion® conductivity: (i) its linear increase with membrane thickness; and (ii) a strong isotope effect with up to fourfold reversible decrease in the power output of PEM fuel cells when hydrogen is replaced by deuterium at the anode. This confirms the higher cell resistance, seen in ITEC operation, as an artifact of transporting deuterium across Nafion® membranes. The overall transport mechanism is governed by both thermodynamics and reaction kinetic effects.

Single Cell Configuration:

The schematic of a simple version of an ITEC with internal components is shown in FIG. 1. The ITEC (10) looks very similar to other types of PEM electrochemical cells. It has several layers of square or circular shaped components held together by a set of bolts (15) along its perimeter. There are two separated sides in the cell: (i) anode side, where the hydrogen gas is fed and excess hydrogen leaves; and (ii) cathode side, where hydrogen gas is produced and possibly pumped to a higher pressure. The components of the illustrated cell design are described below:

1. End-plates and insulator: There are two flanges on the outer sides of the cell to hold everything together. These flanges serve as the end plates (16) of the cell with openings for gas inlet (17) and outlets (18). In the embodiment illustrated, the anode side flange and the cathode side flange is made of stainless steel. Other materials capable of withstanding pressure and electrochemical environment may also be used. There is a thin sheet (19) in between the end plate and the electrical connector plate that provides insulation against electrical current from getting to the end plate.

2. Electrical connector plates: Next to the insulated thin sheet toward the center are the anode and cathode electrical connector plates (20), as shown in FIG. 1. In the embodiment illustrated, they both are made of titanium or stainless steel or aluminum and are electrically insulated from the end-plates. The ITEC is connected to an external direct current (DC) power source via these two plates.

3. Current carrier (21): These are titanium or stainless steel or aluminum based mesh, shaped according to the geometry of the cell active area that help carry current to the electrodes of the ITEC. The meshing also forms a pathway for humidified gas accessing the anode or discharging from the cathode during operation. Design and development of the current carrier is focused in reducing the resistance to electronic pathway, while maintaining adequate pathway for the hydrogen gas-water vapour mixture that reside behind the gas diffusion layer.

4. Electrode assembly: This is the combination of gas diffusion layer (GDL) and the catalyst layer available for the reaction. The constituents for this assembly could be the same on both anode and cathode sides, or different on either side depending on the nature of the isotopic separation required.

a) Gas diffusion layer (GDL) (22): This has a layer of material that is permeable to gas and moisture; is electrically-conductive and; is partially hydrophobic (either blended or coated with water-repelling compound such as Teflon®). Often a type of carbon paper or carbon cloth is used as a GDL material. Other materials with similar properties can be used depending on the need to reduce electronic resistance, improve cell performance and reduce cost.

b) Catalyst (23): The catalyst in the form of carbon supported-platinum powder (other similar catalysts may be used primarily to reduce cost while maintaining performance) is mixed along with a polymer like Nafion® and sprayed or printed or coated on to the GDL (22) to form the electrode assembly.

5. Proton exchange membrane or polymer electrolyte membrane (PEM) (25): In this cell the electrolyte is in the form of a polymer that creates ionic transport paths when hydrated (brought in contact with water or water-vapour). Such membranes are commercially available, including membranes made from the polymer Nafion® with varying dry thicknesses available for use. In certain non-limiting embodiments, membranes made with DuPont Nafion® NR212, N115, N117 and N1110, or with sulphonated PEEK may be used. The membrane thicknesses when dry can vary, in some instances, from about 0.05 mm to about 0.25 mm. The membrane thickness changes when hydrated depending on its polymer's characteristic.

6. Membrane electrode assembly (MEA): This is a combination of the membrane with the anode and cathode electrode assemblies (GDL and catalyst layer combined), and can be made either as one integrated assembly by pressing them together at a certain temperature and pressure for an amount of time or by just arranging them in layers as shown in FIG. 1 and letting the pressure from the bolts hold these three layers together.

7. Gas and vapour flow inlet and outlets (17,18): There are three ports (made of plastic or stainless steel fittings) for the gas and vapour/liquid to enter and leave the cell:
   a) FEED: The feed contains hydrogen gas in isotopic equilibrium with water vapour or water. The moisture in the hydrogen is necessary to keep Nafion®-type membranes wet, which increases the proton conductivity, of the membranes. The feed stream enters the anode side of the cell through the inlet port (17) as shown in FIG. 1. The actual feed flow rate and composition varies depending on the operating conditions.
   b) EXTRACT: The extract contains the isotopically enriched or depleted hydrogen gas and water vapour/water. This is the product stream that exits the cell on the cathode side as shown in FIG. 1. The hydrogen gas in the extract can be at elevated pressure.
   c) RAFFINATE: The raffinate contains the balance of feed, typically hydrogen gas and water vapour or water. It will contain the balance of the isotope not transferred to the extract. The raffinate stream exits the cell on the anode side as shown in FIG. 1.

Internal gas and vapour flow management: The isotope separation on either side of the membrane may be dominated by two aspects of internal gas/vapour flow arrangement: (i) setting a gradient in concentration potential difference (CPD) between the two sides of the membrane in the active area from FEED to RAFFINATE, and; (ii) controlling the axial dispersion of gas and vapour in reducing localized CPD between FEED and RAFFINATE ports on the anode side.

Figure 2A:
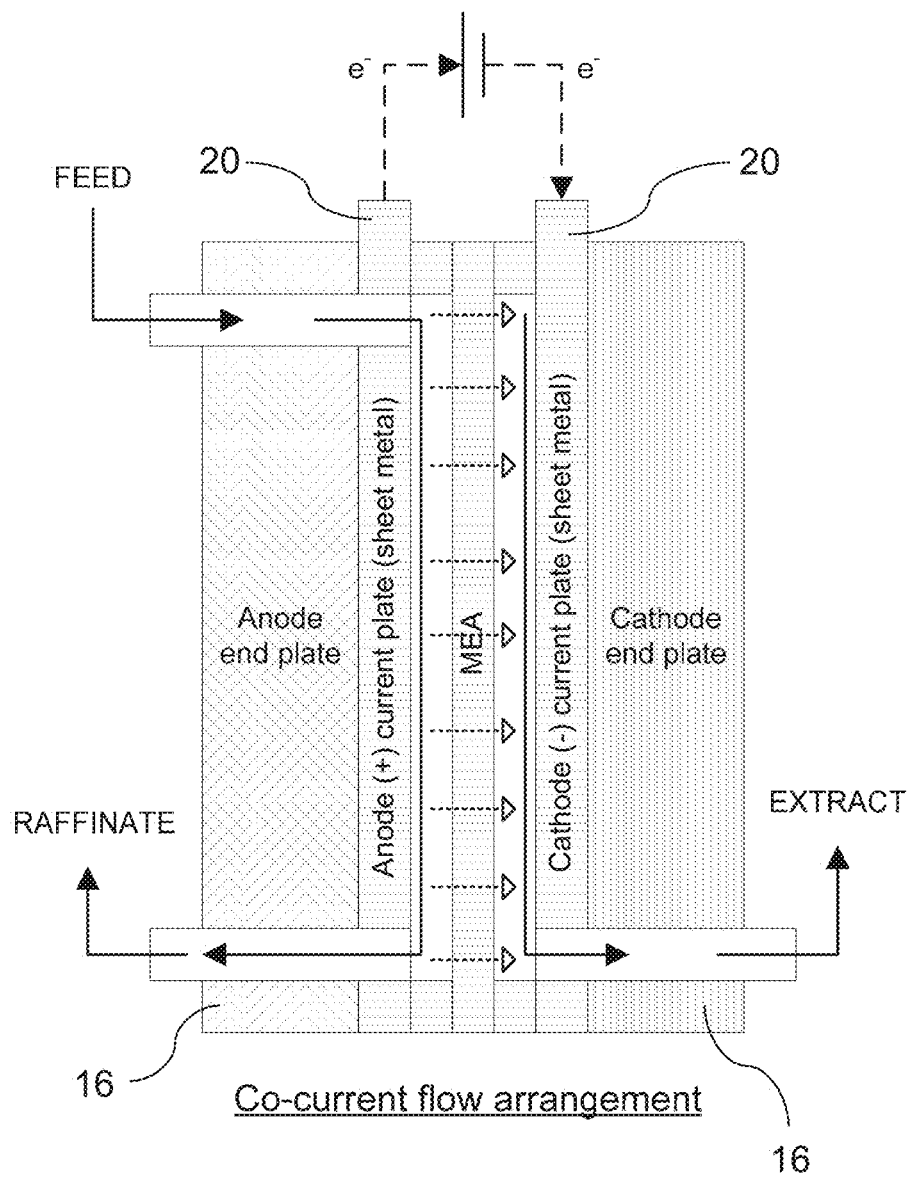
FIGS. 2A-2B illustrate schematic diagrams of (FIG. 2A) an example of a co-current flow arrangement of an ITEC and (FIG. 2B) an example of a counter-current flow arrangement of an ITEC, in accordance with further embodiments of the invention.
Figure 2B:
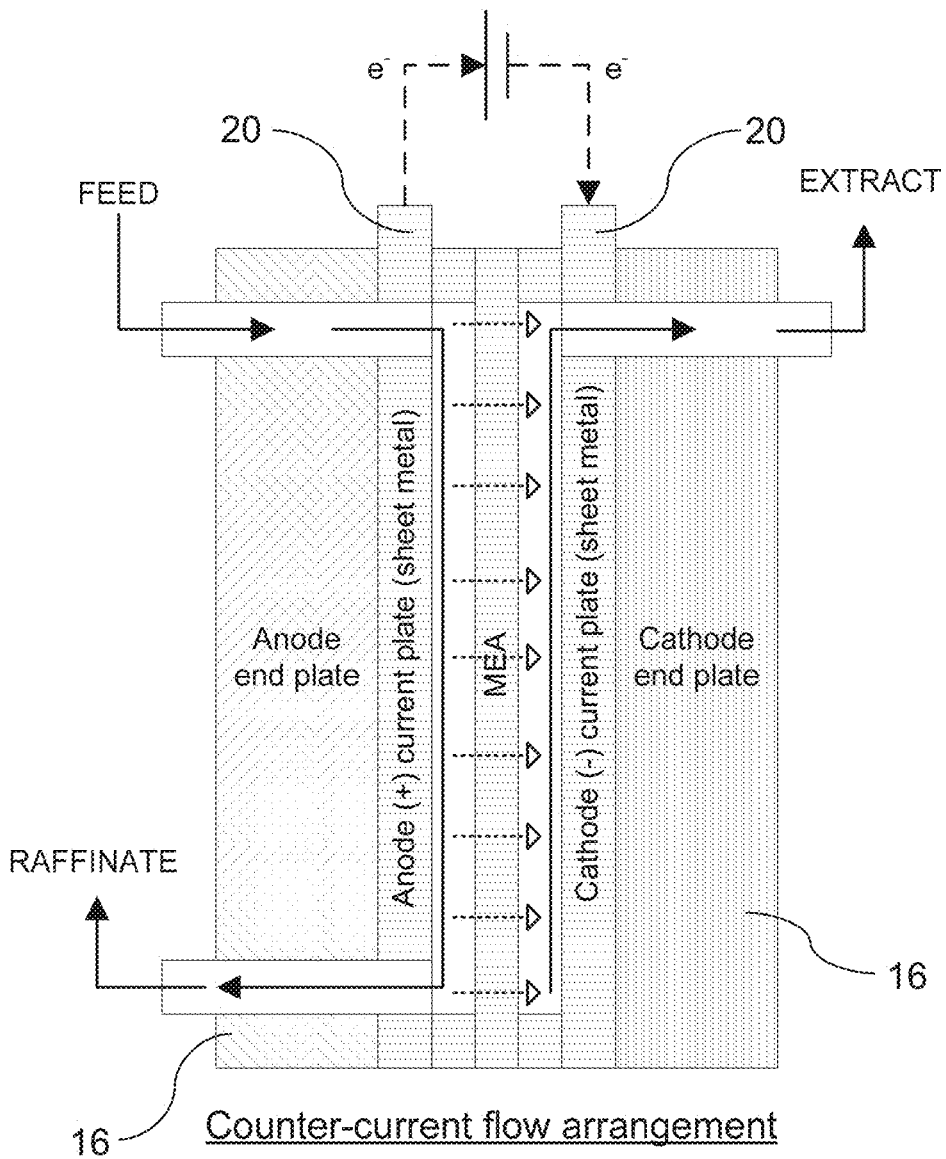

Setting a gradient in CPD of the heavier isotope between the two sides of the membrane is done by either by changing the position of the EXTRACT port on the cathode side as shown in FIGS. 2A and 2B or by reversing the flow direction of FEED stream. There are two possible arrangements, similar to flow of two fluids in a mass transfer column: (i) co-current and (ii) counter-current, based on FEED and EXTRACT flow directions, as depicted in FIGS. 2A and 2B. The counter-current flow arrangement has demonstrated better isotopic separation than the co-current arrangement, proving the existence of a gradient that is independent of other functions of the cell but the flow arrangement and possibly in combination with axial dispersion (path function between flow ports).

The axial dispersion of flow occurs due to the presence of non-plug flow (when using layered mesh current carriers) and minimizing this dispersion will reduce localized concentration potential difference (CPD) thus maintaining higher potential between the two sides of the membrane. On the anode side the GDL may disperse gas/vapour flow unevenly across its area thus the isotope concentrations between the FEED and RAFFINATE creates uneven localized CPD. To avoid the dispersion, linear pathways for gas/vapour flow may be created using flow channels that are typical of fuel cells but with modifications needed to suit ITEC operation.

Figure 3:
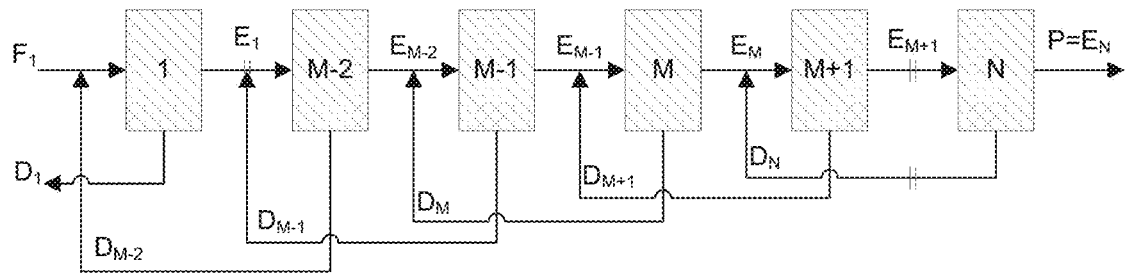
FIG. 3 illustrates an example of an embodiment of a cascaded arrangement of ITECs, useful for deuterium enrichment.
Figure 4:
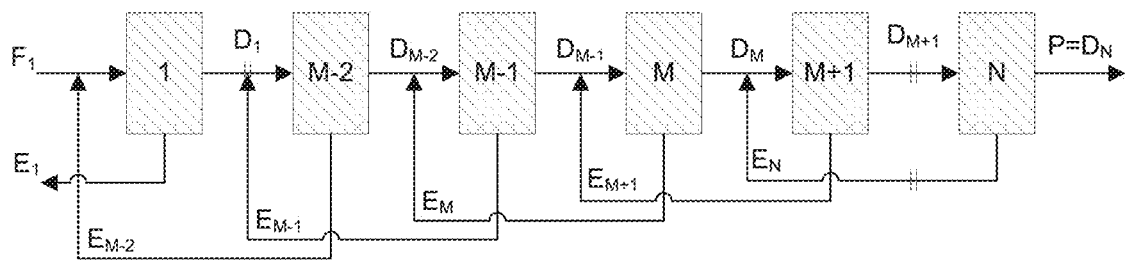
FIG. 4 illustrates an example of an embodiment of a cascaded arrangement of ITECs, useful for tritium removal.

Multi-Cell/Cascaded Configuration:

A cascaded arrangement is when several ITECs are arranged in a manner where the isotopically depleted gas from the next ITEC is added to the feed of the previous ITEC in such a way that higher levels of isotope enrichment/depletion can be achieved. FIG. 3 and FIG. 4 show two cascaded flow system arrangements using a plurality of ITECs in series. The arrangement in FIG. 3 is for enriching deuterium where the enriched gas from the first stage becomes feed for the second stage, second enriched gas becomes feed for the third stage, and so on. The depleted gas is reconnected to the feed of a previous stage based on the condition that the concentration of deuterium in that feed is less than depleted gas. For example, if $D_M$ (depleted gas from the intermediate stage) is greater or equal to $E_{M-2}$ then M is the stage starting from first that actually can use the deuterium in the depleted gas stream $D_M$. So, all stages before M will have depleted gas streams with lower concentrations than streams after $M^{th}$ stage.

In FIG. 4, the arrangement shown is for removing tritium from the feed. This is the opposite of that shown in FIG. 3, in that the depletion happens in the forward direction rather than enrichment. Thus both cascaded arrangements can be used reversibly depending on the feed isotope concentration. In FIG. 4 the depleted gas from the first stage becomes feed for the second stage, second depletion becomes feed for third stage, and so on. The enriched gas is reconnected to the feed of a previous stage based on the condition that the concentration of tritium in that feed is more than enriched gas. For example, if $E_M$ is less than or equal to $D_{M-2}$ then M is the stage starting from first that actually can use the tritium in the enriched gas stream $E_M$. So, all stages before M can only store the enriched gas streams due to higher concentrations of tritium than tritium in depleted streams from previous stages.

Methods of Operation:

As discussed above, the ITEC can in certain embodiments be used for: (i) hydrogen isotope separation and (ii) increasing the product gas pressure, particularly for cascading. To achieve these two goals, the cell operation may involve the following processes:

1. Humidification of feed gas: Isotope separation occurs between the source hydrogen gas and water vapour that accompanies it. So the feed gas is either humidified outside the cell with water vapour or liquid water is injected into the feed gas and is humidified inside the cell. In both cases, the isotope concentration of source water is in equilibrium with the gas. When injecting water into the feed gas, the water flow rate can be controlled independent of the gas flow to affect the water content in the membrane.

2. Anode side process: The feed gas and water vapour mixture flows to the anode side of the cell (FIG. 1). The electric current available at the anode determines the amount of hydrogen available at the cathode by proton transfer through the membrane assembly into the cathode side of the cell. The anode side process of ITEC is very similar to the anode side process of a PEM fuel cell where the hydrogen oxidation reaction occurs.

3. Excess/raffinate gas and vapour stream: Any excess gas and water vapour exits the anode side of the cell, which may be cooled to remove condensate. The deuterium concentration in the condensate is changed from that of the feed water vapour based on the enrichment or depletion of the raffinate gas.

4. Cathode side process: In the cathode side of the ITEC, the protons transported through the membrane combine with electrons to form gaseous hydrogen and a condensed phase that exits as water vapour with the gas. The cathode side process of ITEC is very similar to the cathode side process of a PEM water electrolysis cell where the hydrogen evolution reaction occurs.

5. Extract/pumped gas and vapour stream: The gas and water vapour leaving the ITEC on the cathode side is the extracted hydrogen, meaning it is pumped up to the set exit pressure with enrichment or depletion of deuterium/tritium compared to the feed gas. The stream is cooled to remove condensate and the dry gas is collected. This gas is analysed to estimate the degree of isotope exchange due to this electrochemical process. The deuterium concentration in the condensate is changed from that of the feed water vapour based on the enrichment or depletion of the extract gas.

Examples

Optimization of ITEC Characteristics:

Optimization of the ITEC features has been carried out using deuterium separation. However, it is possible to extrapolate the optimal features for tritium separation from the deuterium separation experiments, based on experience in similar electrochemical separation systems.

Five membranes were tested. Of these, it was found that Nafion® NR212 and SPEEK had lower separation efficiency than the other three (Nafion® N115, Nafion® N117 and Nafion® N1110). Thus, these two membranes are generally not included in the discussions below except for comparative purposes.

The following parameters were used to characterize the performance of the ITEC based on the described experimental configuration:

1. Enrichment ratio (ER): This is the ratio of deuterium concentration in the extract gas stream to that in the raffinate gas stream. This is also referred to as the 'separation factor'—a term generally used in literature of hydrogen isotope separation processes. Primary ITEC operating parameters are compared against this ratio. The maximum enrichment ratio achieved so far using a single cell configuration was about three, at a cell voltage of 0.5 volts using membrane Nafion® N117. The maximum enrichment ratio is subject to improvement upon further modifications to cell materials and operating conditions.

Figure 5:
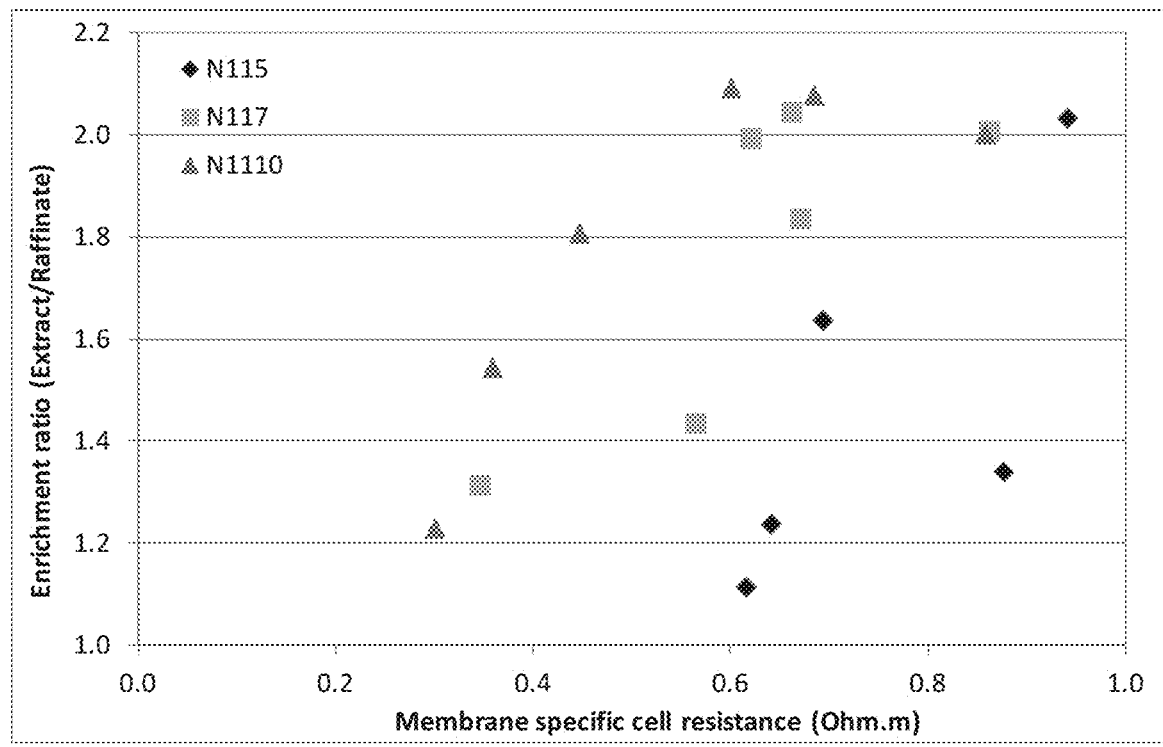
FIG. 5 shows the results of the effect of membrane specific cell resistance (MSCR) on enrichment ratio for Nafion® N115, N117 and N1110 membranes.

2. Membrane specific cell resistance (MSCR): This is the ratio of actual cell voltage to current multiplied by the ratio of membrane area to thickness with a unit of Ω·m. MSCR for a given membrane increases with electrical power, since the separation increases with cell voltage. MSCR also was observed to be affected by the amount of platinum catalyst in the electrodes and Nafion®-carbon ratio in the gas diffusion layer. Higher platinum loading and higher cell temperature reduced the MSCR. The isotope separation is generally found to have a positive correlation to the MSCR for all the membranes tested (as shown in FIG. 5)—higher enrichment ratio is associated with higher cell resistance.

3. Catalyst: Catalyst is necessary to enable the electrochemical reactions such as the oxidation reaction in the anode to evolve protons for effective isotope separation and subsequent transport of protons across the membrane to the cathode side, where, catalyst is needed to enable reduction reaction to evolve deuterium enriched hydrogen gas. The following are catalyst related performance characteristics of ITEC:

Catalyst layer thickness: At a higher catalyst loading density the catalyst layer adds a certain thickness to the GDL increasing the electrical resistance slightly. The higher catalyst loading density the thicker this catalyst layer becomes. This may not improve the cell performance due to the poor catalyst utilization, as the additional catalyst layers may hinder gas to access all the catalyst sites. This was evident in tests done with catalyst loading densities higher than that reported in FIG. 6. The catalyst coating procedure and catalyst layer thickness is subject to further investigation whose effects may improve cell performance.

Figure 6:
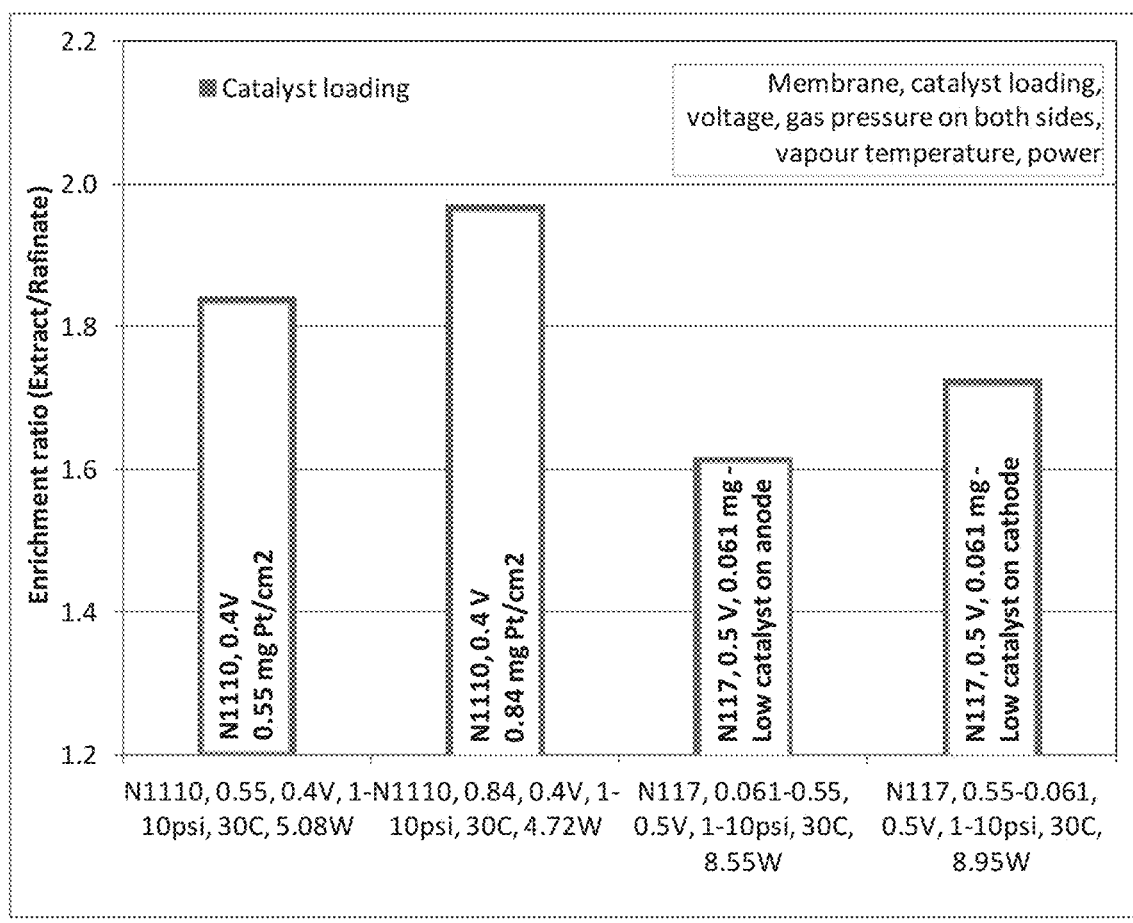
FIG. 6 shows the results of testing the effect of catalyst loading density on enrichment ratio for Nafion® N117 and N1110 membranes.

Catalyst loading: Increased catalyst loading seems to have less impact on the enrichment ratio of membrane N117 while it increased enrichment ratio by 10% for membrane N1110, as shown in FIG. 6, at catalyst loading densities of 0.55 mg Pt/cm$^2$ and 0.84 mg Pt/cm$^2$.

Anode catalyst loading: ITEC will not work as designed without catalyst on the anode but will function even with very low catalyst loading correspondingly with very low enrichment ratio.

Cathode catalyst loading: ITEC will work without catalyst on the cathode but only in isotope depletion mode, that is with an enrichment ratio less than 1.0.

High and low catalyst loading: When catalyst is coated onto a gas diffusion layer, a loading beyond 0.8 mg Pt/cm$^2$ is found not to improve separation while all other conditions remain the same. Catalyst loading below this number reduces the enrichment ratio.

Different loading on anode and cathode: The enrichment ratio is different when the catalyst loading is different on the anode and cathode. Lower catalyst on anode reduces the enrichment ratio significantly (comparing first and third rectangles in FIG. 6) compared to the case of lower catalyst on cathode (comparing first and fourth rectangles in FIG. 6). This suggests that the anode side has the rate-limiting step with isotope separation occurring mostly in the anode catalyst.

Figure 7:
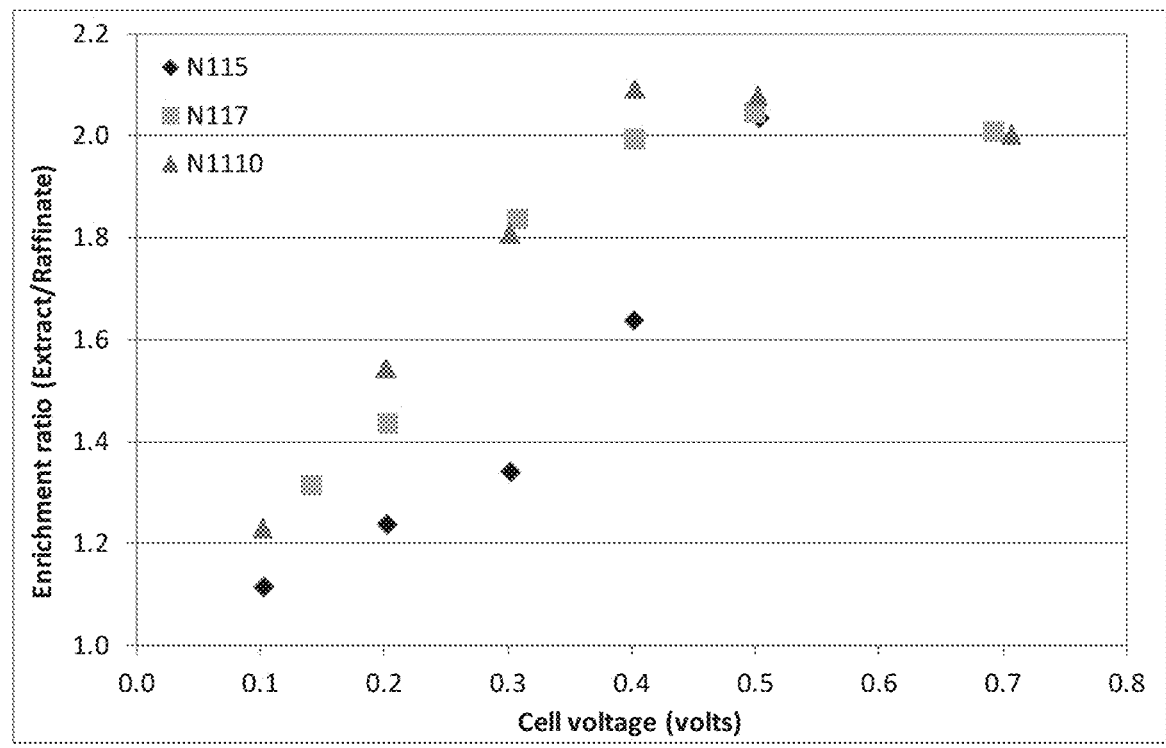
FIG. 7 shows the results of testing the effect of cell voltage on enrichment ratio for Nafion® N115, N117 and N1110 membranes.

4. Cell voltage: Cell voltage seems to be one of the important driving mechanisms for better enrichment ratio (isotope separation factor) based on experimental tests done on ITEC. All three membranes N115, N117 and N1110 have almost proportional increase with voltage from 0.1 to 0.5 volts as seen in FIG. 7. There seems to be a threshold at around the same voltage (between 0.4 and 0.5 volts) where the enrichment ratio is just over 2 for all three membranes. This has been confirmed for the cell and vapour temperatures ranging from 20 to 40° C. The enrichment ratio is lower on either side of this threshold voltage as shown in FIG. 7 and is the subject of further investigation.

Figure 8:
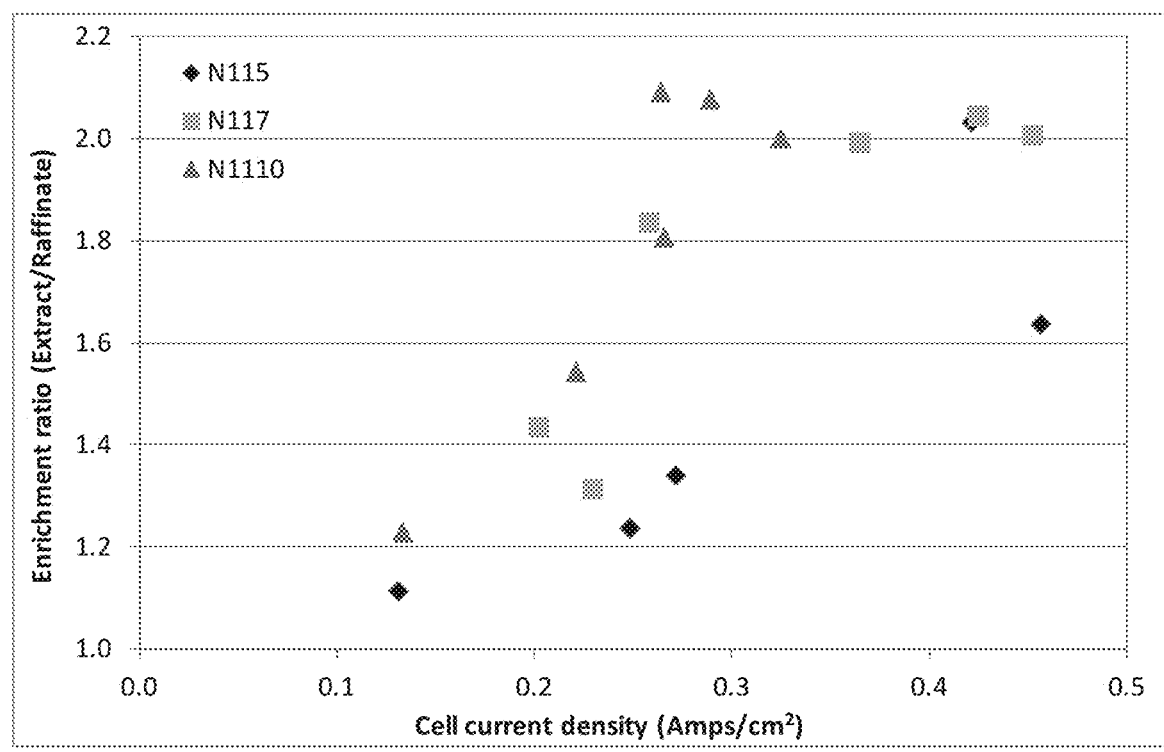
FIG. 8 shows the results of the effect of cell current density on enrichment ratio for Nafion® N115, N117 and N1110 membranes.

5. Cell current density: The current density determines the rate of hydrogen transferred by the cell) per unit area of the MEA, with expectations of higher value being better cell performance. FIG. 8 provides the cell current density data for the three membranes and the corresponding enrichment ratios. The enrichment ratio increases with current densities for all three membranes. Thicker membranes (N1110 and N117) tend to have higher enrichment ratios.

Figure 9:
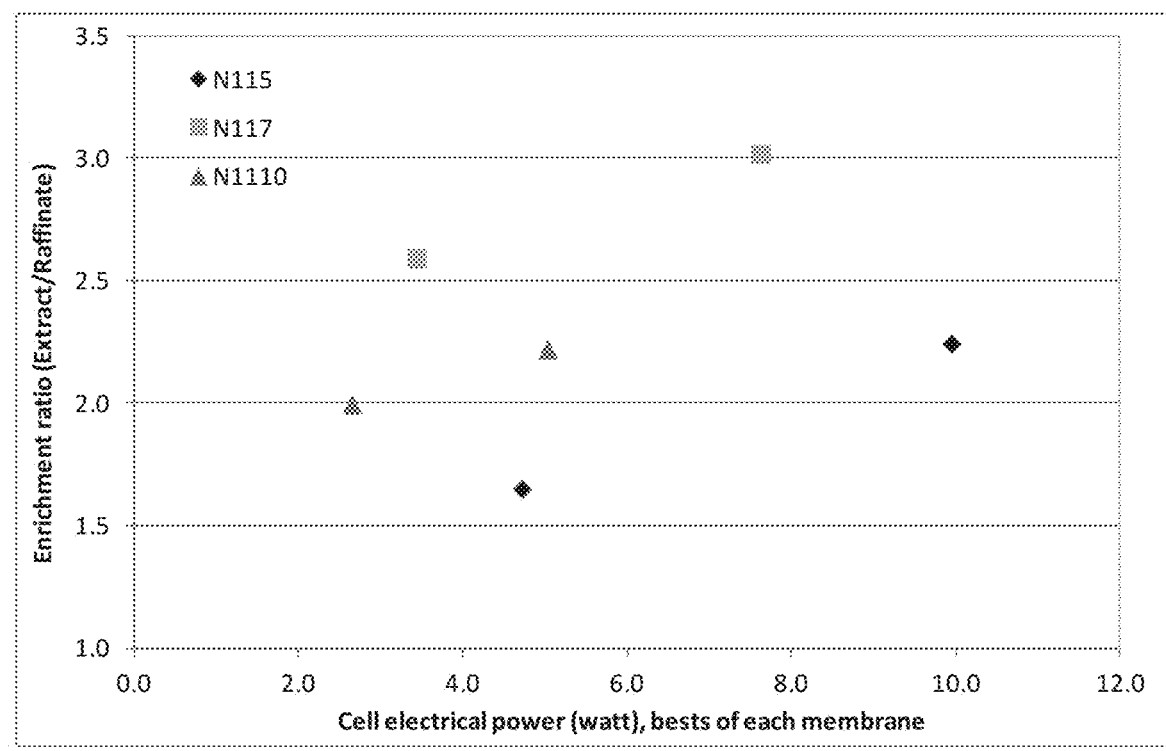
FIG. 9 shows the results of the effect of cell electrical power on two best enrichment ratios for Nafion® N115, N117 and N1110 membranes.

6. Cell power: Better separation at lower power would make the ITEC more attractive than a water electrolysis cell in terms of both capital and operating costs. FIG. 9 shows the two best separations per membrane achieved at the lowest power consumption yet. Among the three, N117 performed the best with a enrichment ratio of 2.6 at about 3.4 watts. With further improvements to cell components and operating conditions, higher separation at lower power than that reported in FIG. 9 is possible.

7. Cell temperature: The relatively modest effect of temperature on separation factor is evident in the data provided in FIG. 10, where separation shows a maximum at about 25° C. for all three membranes.

Figure 11:
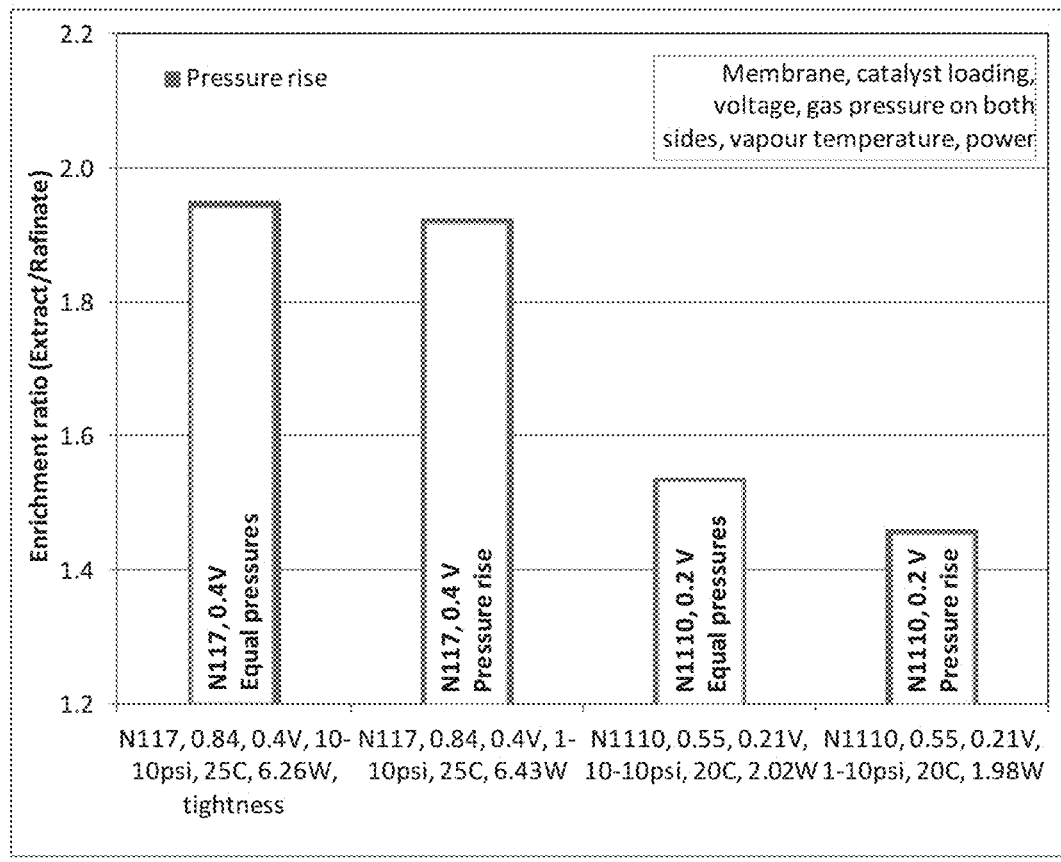
FIG. 11 shows the results of testing the effect of gas pressure on enrichment ratio for Nafion® N117 and N1110 membranes.

8. Gas pressure: Increasing the extract (product stream) pressure for compressing hydrogen gas has a small effect on enrichment ratio. Electrochemical pumping operation at lower pressure on the feed side and higher pressure on the extract side reduces the separation marginally (in FIG. 11 comparing $1^{st}$ and $2^{nd}$ bars). This separation reduction is more significant at lower voltages as shown in FIG. 11 (comparing $3^{rd}$ and $4^{th}$ bars).

Figure 12:
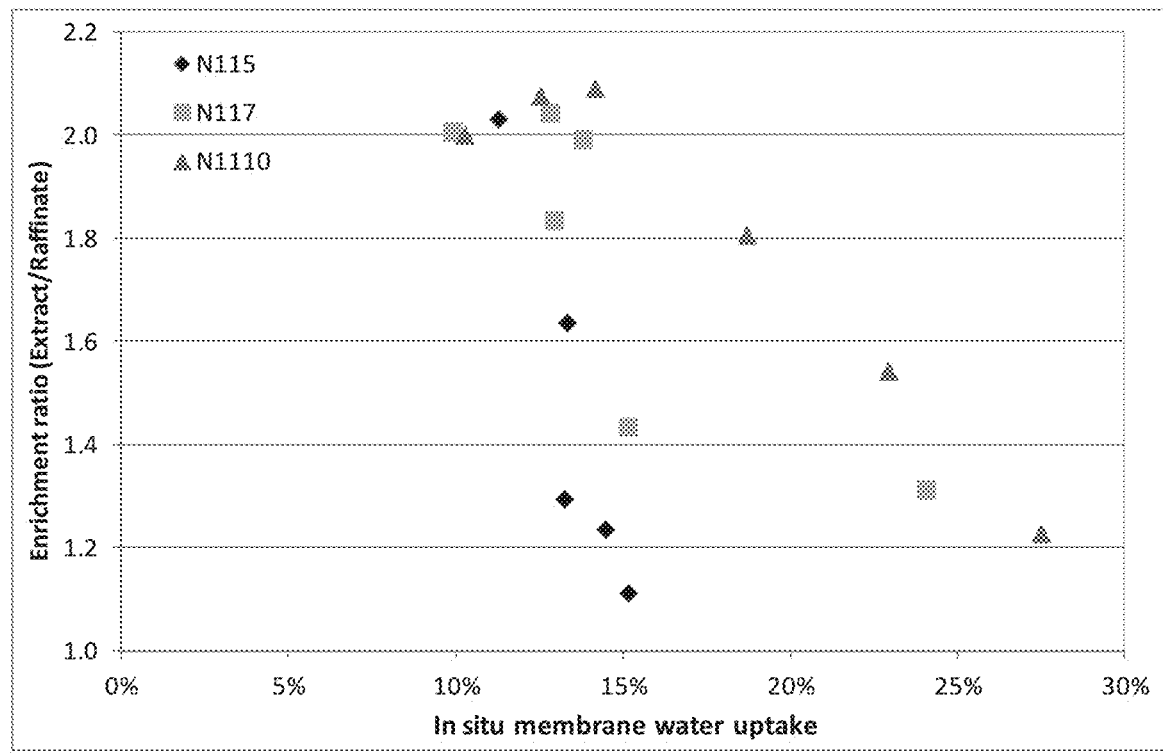
FIG. 12 shows the results of testing the effect of in situ membrane water uptake on enrichment ratio for Nafion® N115, N117 and N1110 membranes.

9. Humidity: Water vapour in the feed is necessary to hydrate the membrane to conduct protons across the membrane and to enable isotope separation between the raffinate and extract. There are two ways to humidify the gas entering the cell: (i) using a humidifier; and (ii) using direct water injection into the feed. In the direct water injection, the water becomes vapour at cell temperature inside the cell. The gas exiting the cell is moist and the amount of water carried by the raffinate and extract streams depend on feed gas pressure, cell temperature, voltage, current and the membrane properties. At high temperatures more vapour is made available in vapour-saturated gas stream but too much vapour did not improve separation. Too little vapour might dry up the membrane thereby increasing the cell electrical resistance. The Nafion® membranes used performed well when they remained partially wetted as shown in FIG. 12, where the best separation is when the membrane water uptake is lower. With direct water injection to the feed stream, enrichment ratio was found to be lower when the water flow rate was increased consistently.

10. Membrane: There are two main aspects for a given type of membrane that affect the ITEC performance in terms of higher enrichment ratio: (i) membrane water uptake; and (ii) membrane thickness.

Figure 10:
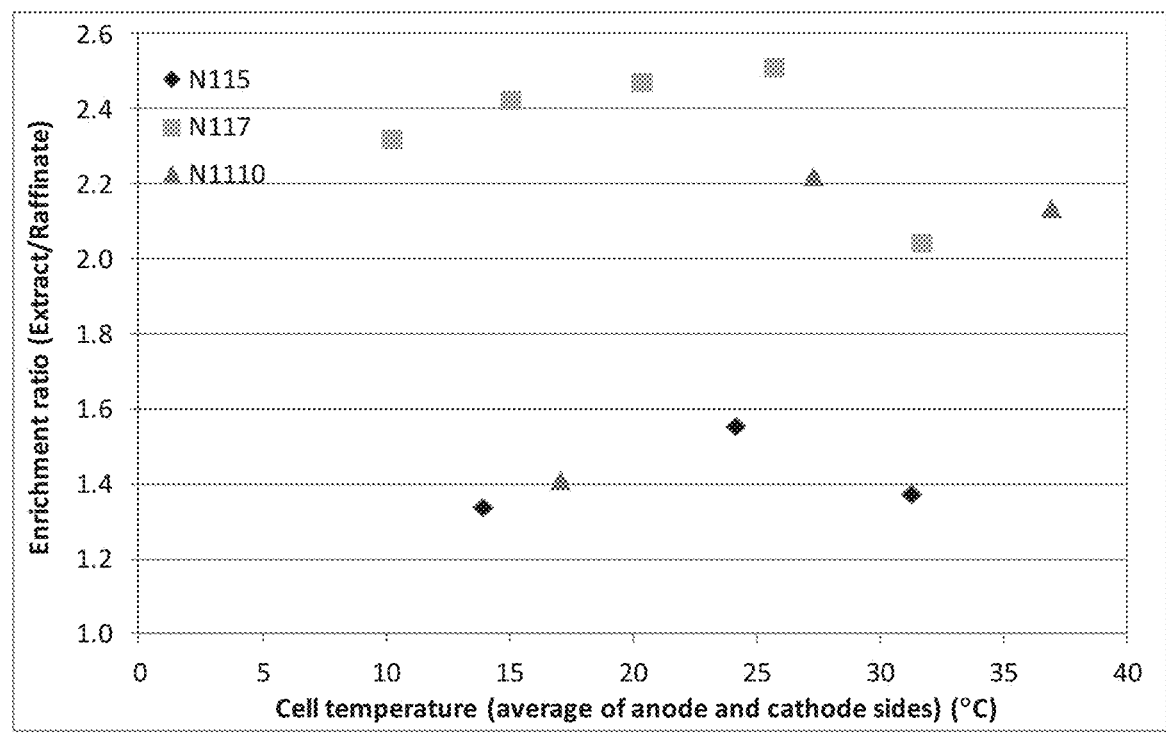
FIG. 10 shows the results of the effect of cell operating temperature on enrichment ratio for Nafion® N115, N117 and N1110 membranes.

Membrane water uptake: Proton conductivity of the membrane (and thus its performance) depends on its water content which is related to the water uptake percentage. FIG. 10 shows the best separation for all three membranes in the temperature range of 20 to 25° C. suggesting that the membrane need not be fully hydrated for the best separation. The level of hydration or water uptake by the membrane is difficult to measure but can be deduced from a proton conductivity calculation. From Nafion® membrane characteristics, the higher the water uptake the lower is the membrane resistance. But for the ITEC, better enrichment ratio is always associated with higher MSCR (FIG. 5) which results from lower water uptake. Based on the deduced data in FIG. 12, this may be a distinguishing feature of ITEC when compared with PEM water electrolysis cell and PEM fuel cell in terms of the hydration levels needed to operate optimally.

Figure 13:
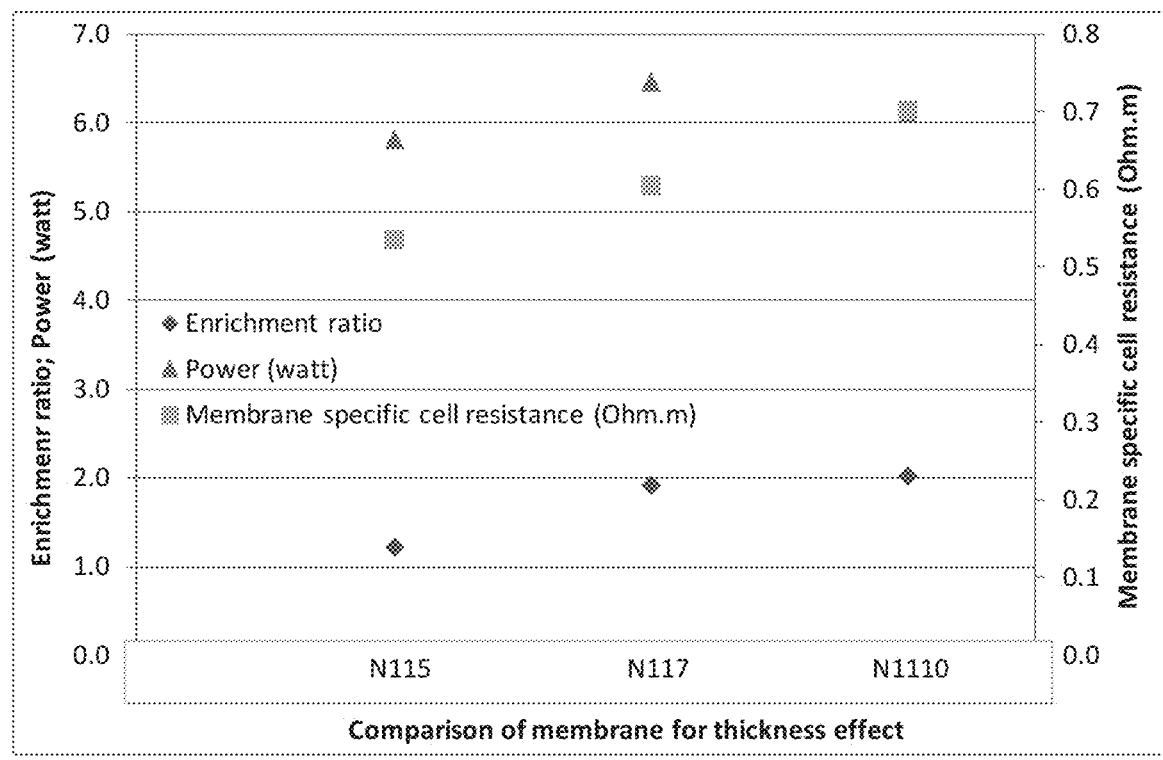
FIG. 13 shows the effect of membrane thickness on enrichment ratio for Nafion® N115, N117 and N1110 membranes.

Membrane thickness: The thicknesses for membranes N115, N117 and N1110 are the only difference between these membranes (ex situ and dry) and they are 0.127, 0.178 and 0.25 mm, respectively. N1110 has the best separation observed in these studies, and is thicker than all other membranes tested. The difference in separation for three membranes is shown in FIG. 13 for the same power, flow ratios, catalyst loading, cell temperature and pressure. This suggests that the thicker membrane provides better separation but at the cost of having higher MSCR.

Figure 14:
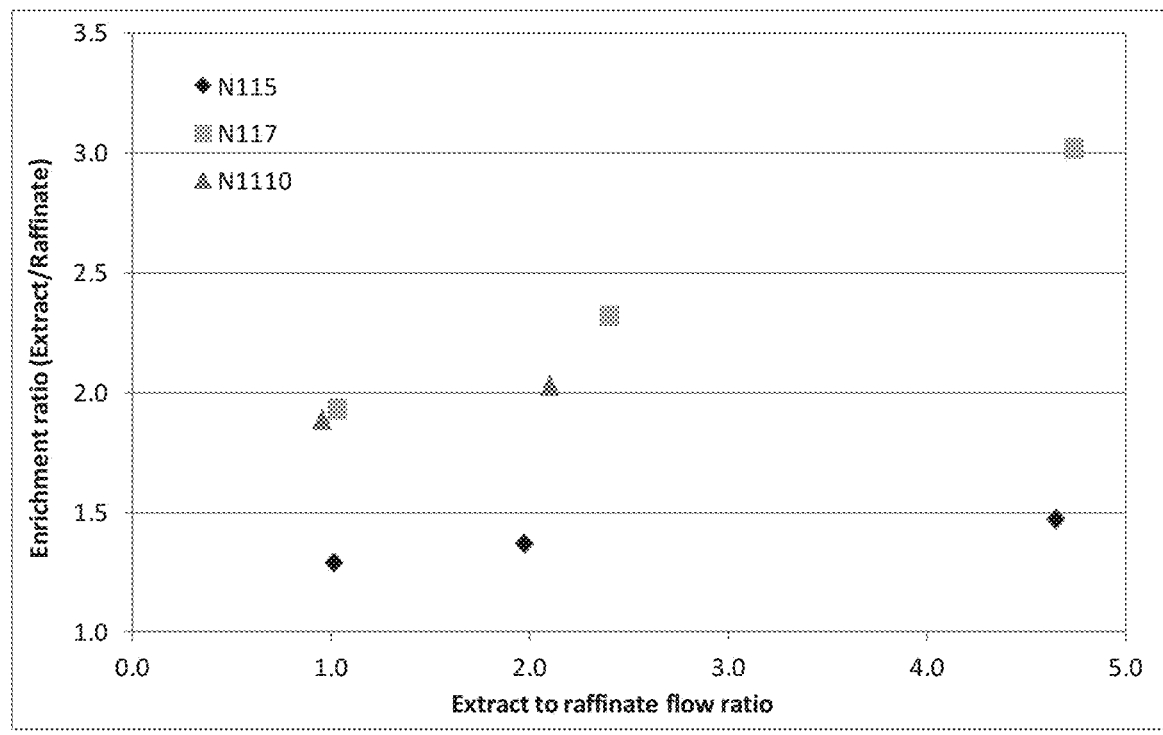
FIG. 14 shows the results of testing effect of extract to raffinate flow ratio on enrichment ratio for Nafion® N115, N117 and N1110 membranes.

11. Extract to raffinate flow (gas and vapour) ratio: Other than the cell voltage, the flow ratio between the extract (cathode side) and the raffinate (anode side) provides the best driving mechanism for higher enrichment ratio in ITEC. This is evident in FIG. 14 for the three membranes, especially for the thicker membranes (N117 and N1110). One possible reason for this is that the depletion of the feed gas is progressive as it flows through the cell (a rate-governed process), so the longer residence time in the cell at higher flow ratios results in greater depletion in the raffinate. Thus the best enrichment ratio for all membranes achieved so far (FIG. 14) is when the raffinate flow was about five times lower than the extract. This flow ratio is not expected to be the limit.

Figure 15:
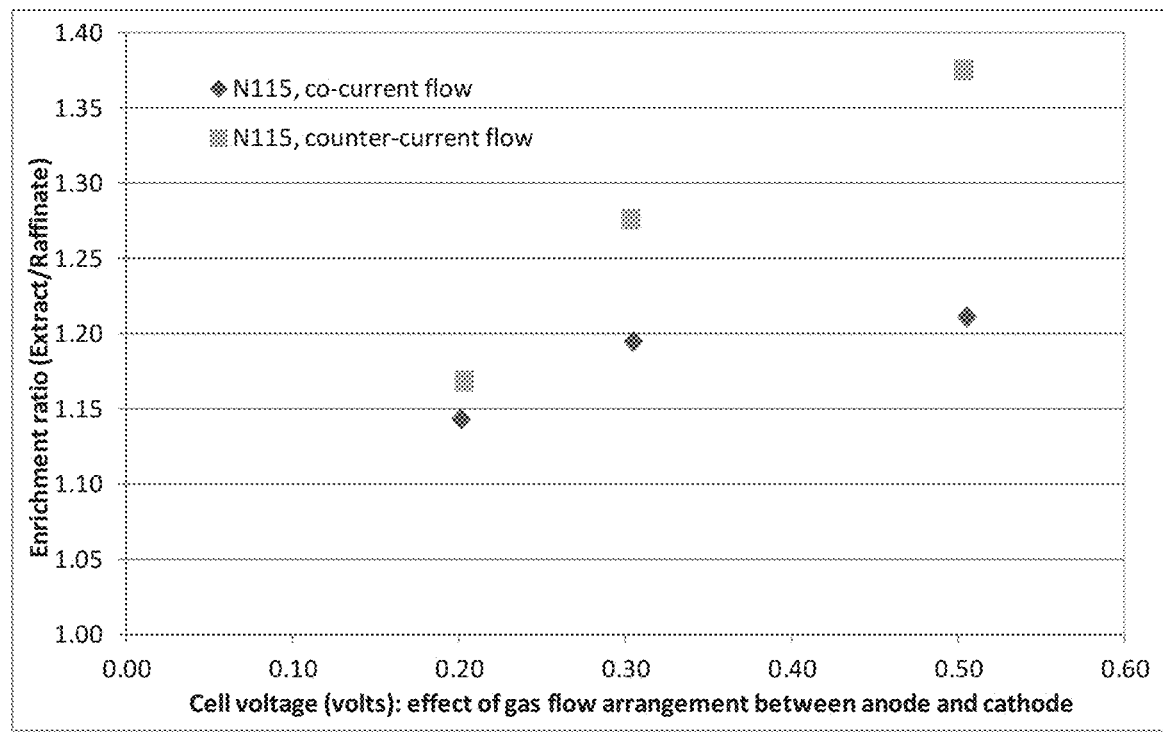
FIG. 15 shows results of testing differences in enrichment ratio for Nafion® N115 membrane due to co-current and counter-current flow arrangements.

12. Flow arrangements: The gas flow arrangement comprises two aspects of the cell design: (i) extract flow port arrangement (or reversing flow of FEED stream); and (ii) axial flow dispersion inside the cell on the non-catalyst side of the GDL. The flow arrangement between the two sides of the cell as shown in FIGS. 2A and 2B does affect the enrichment ratio. The counter-current arrangement provides higher enrichment ratio (as shown in FIG. 15) suggesting the existence of varying concentration potential difference between the two sides of the membrane as the gases flow through each side of the cell. This is consistent with the observations on the effect of flow ratio mentioned previously.

Applications:

The electrochemical cell and methods of the present invention may be implemented in a variety of configurations for the enrichment or removal of hydrogen isotopes. Without wishing to be limiting in any way, the following are possible applications that may be carried out using ITECs as described above.

Heavy water production: Looping several ITECs in a cascaded system (e.g. as shown in FIG. 3) increases deuterium enrichment in steps to achieve very high concentrations. A simple cascading system with recycle from a higher enriched stage to a lower stage, as shown in FIG. 3, was modeled for a fixed enrichment ratio of 2. The results indicated that it would require about 43 ITECs to achieve nuclear reactor grade heavy water (99.75-99.98%). A similar cascaded arrangement (e.g. as shown in FIG. 4) can be used for removing high levels of tritium from a gas feed humidified with enriched vapour.

Tritium decontamination: Any application or process requiring modest removal of tritium is a possible application. For example, the ITEC is suitable for lower stages of a tritium removal process; for drinking water tritium removal; and for decontaminating low levels of tritium in service water from a shutdown nuclear reactor.

Tritium monitoring: To measure low levels of tritium in water/hydrogen gas exhausts of nuclear power plants, the ITEC may be coupled with tritium monitors at various tritium testing locations. A sample can be processed through the ITEC to provide a tritium enriched stream that would improve sensitivity of tritium detection.

Isotope separation: Separation of isotopes of elements other than hydrogen from the feed stream to the extract (product) stream is possible. Depending on the element and isotope(s) involved, the internal components of ITEC are subject to minor changes, especially the material of the ion exchange membrane that separates the two sides of the cell and the catalyst used in the MEA.

One or more currently preferred embodiments have been described by way of example. It will be apparent to persons skilled in the art that a number of variations and modifications can be made without departing from the scope of the invention as defined in the claims.

What is claimed is:

1. A system comprising a plurality of isotope transfer electrochemical cells, wherein each cell comprises:
   (i) an anode plate and a cathode plate;
   (ii) a proton exchange membrane;
   (iii) gas diffusion layers positioned on either side of the proton exchange membrane, which together with the proton exchange membrane form a membrane electrode assembly; and
   (iv) a housing containing the anode and cathode plates in operable arrangement with the membrane electrode assembly, and defining a gas feed inlet, a product outlet, an outlet for excess gas, and internal flow paths for transfer of gases/vapors and fluids on either side of the membrane electrode assembly and
   wherein the plurality of cells are arranged in series and configured to
   (a) pass isotopically depleted hydrogen from the product outlet of a cell to the gas feed inlet of the next cell in the series, or
   (b) direct isotopically enriched hydrogen gas from the product outlet of a cell to the gas feed inlet of the next cell in the series, and
   wherein the outlet for excess gas is re-routed back to the gas feed inlet of previous cells in the series.

2. The system of claim 1, wherein the system is for removal of tritium from a hydrogen source or for enriching deuterium in a hydrogen source.

3. The system of claim 1, wherein the proton exchange membrane comprises a polymer-based electrolyte.

4. The system of claim 1, wherein the gas diffusion layers each comprise catalyst-coated porous conductors.

5. The system of claim 4, wherein the catalyst-coated porous conductors are hydrophobic.

6. The system of claim 1, wherein the anode and cathode plates comprise an anode side flange and a cathode side flange made of structural material such as aluminum, stainless steel or fibre-reinforced polymer and/or wherein the anode and cathode plates each comprise current connectors to connect to an external power source.

7. The system of claim 6, wherein the current connectors are made of titanium or stainless steel or aluminum and are electrically insulated from the anode and cathode plates.

8. The system of claim 1, further comprising current carriers, or current carrier plates, positioned between the gas diffusion layers and the respective anode or cathode, the current carriers being of a material effective to carry current to the electrodes and to form a pathway for gas, vapour and condensed phase accessing the anode and discharging from the cathode during operation.

9. The system of claim 8, wherein the current carriers comprise titanium or stainless steel or aluminum based mesh layers or porous material or plate type flow channels or grooves of suitable geometry.

10. The system of claim 1, wherein the membrane electrode assembly is comprised of two layers of electrically-conductive gas diffusion layer with catalyst and related material coated on the side that is held up against either side of a proton exchange membrane.

11. The system of claim 1, wherein the gas diffusion layer comprises a catalyst comprising a supported-platinum powder mixed with similar polymer material as in the membrane held in a porous electrically-conductive, partially hydrophobic substrate.

12. The system of claim 1, wherein the proton exchange membrane comprises:
   (i) a membrane made of polymers with similar functions to sulfonated tetrafluoroethylene,
   (ii) any one of the following: Nafion® NR212, N115, N117 or N1110, or sulphonated PEEK or other proton conducting membrane; and/or
   (iii) a thickness within the range from about 0.05 mm to about 0.25 mm.

13. The system of claim 1, wherein the housing, hydrogen feed inlet, product outlet, and outlet for excess hydrogen are effective to carry hydrogen gas and water vapour.

14. The system of claim 13, wherein a feed stream travels to the anode through the hydrogen feed inlet and the current carrier.

15. The system of claim 1, wherein the hydrogen feed inlet, product outlet, outlet for excess hydrogen, and internal flow paths are arranged for either co-current or counter-current feed with respect to the extract flow directions.

16. The system of claim 15, wherein the extract contains isotopically enriched or depleted hydrogen gas and water vapour/liquid condensate and a raffinate contains the balance of hydrogen gas and water vapour/liquid condensate from the feed, and the hydrogen gas in the extract can be at elevated pressure.

17. A method of separating isotopes in a hydrogen source, comprising
   providing a system of claim 1,
   feeding a hydrogen gas and water vapour mixture via the feed inlet of the cell to the anode of the cell;
   applying a current between the anode and cathode to facilitate transfer of hydrogen ions from the anode through the membrane electrode assembly to the cathode, the hydrogen ions recombining with electrons at the cathode to form gaseous hydrogen,
   enabling pressure to the hydrogen gas and water vapour leaving the cathode of the cell, the anode of the cell, or both,
   collecting excess hydrogen gas and water vapour leaving the anode side of the cell, and
   collecting extracted hydrogen gas and water vapour leaving the cathode of the cell, the extracted hydrogen gas being enriched in deuterium, tritium, or both as compared to the feed gas.

18. The method of claim 17, wherein the excess hydrogen gas and water vapour collected from the anode, the extracted hydrogen gas and water vapour collected from the cathode, or both, are dried by cooling or adsorption.

19. The method of claim 18, wherein the current is applied at a voltage ranging from about near zero to 0.7 volts.

* * * * *